Nov. 14, 1961   C. F. OLDERSHAW ET AL   3,008,696
MEANS FOR BLENDING VISCOUS LIQUIDS
Filed July 26, 1957                                              3 Sheets-Sheet 1

INVENTORS.
Charles F. Oldershaw
Ralph M. Wiley

BY  Griswold & Burdick
ATTORNEYS

Nov. 14, 1961   C. F. OLDERSHAW ET AL   3,008,696
MEANS FOR BLENDING VISCOUS LIQUIDS
Filed July 26, 1957   3 Sheets-Sheet 2

INVENTORS.
Charles F. Oldershaw
Ralph M. Wiley
BY Griswold & Burdick
ATTORNEYS

INVENTORS.
Charles F. Oldershaw
Ralph M. Wiley

BY *Griswold & Burdick*
ATTORNEYS

United States Patent Office 3,008,696
Patented Nov. 14, 1961

3,008,696
MEANS FOR BLENDING VISCOUS LIQUIDS
Charles F. Oldershaw, Concord, Calif., and Ralph M. Wiley, Midland, Mich., assignors to The Dow Chemical Company, Midland, Mich., a corporation of Delaware
Filed July 26, 1957, Ser. No. 674,439
16 Claims. (Cl. 259—7)

This invention relates both to an improved, novel and unique apparatus means for intimately and efficiently interblending miscible viscous liquids into an homogeneous and uniformly merged viscous product.

It is oftentimes a genuine and difficult problem to suitably interblend viscous liquids into a satisfactorily uniform and homogeneous interdispersed product. This is well appreciated in the art and has been the subject of considerable consternation. Certain aspects of the problem, for example, have been considered with particular emphasis on theoretical aspects by R. S. Spencer and R. M. Wiley in an article entitled "The Mixing of Very Viscous Liquids" which appeared in April 1951, at pages 133–145 of the Journal of Colloid Science, vol. 6, No. 2. Blending may be particularly troublesome when the liquids being blended have relatively high viscosities (as those which are of the order of magnitude that is frequently encountered in many liquid polymer compositions, including various polymeric solutions and dispersions). It is most difficult when the diverse high viscosity liquids that are being interblended have considerable differences in their respective individual viscosity characteristics. This is especially the case when it is desired to accomplish the blending in the manner of a continuous process in which a continuous stream of interblended product is desired or required at relatively high rates of constant output.

It would be advantageous, and it is the principal objective of the present invention, to furnish a means for blending viscous liquids that would be readily and easily capable of obviating the indicated and corollary problems and difficulties. It would be particularly advantageous, and it is a predominating objective of the invention, to provide a blending means eminently well-suited for utilization with liquid polymer compositions, especially for purposes of intimately mixing viscous liquid poylmer compositions of diverse natures and, more especially, for thoroughly and homogeneously merging polymer compositions having significantly different viscosity characteristics into a truly continuous or substantially continuous and uniform phase product.

To the attainment of these beneficial and highly desirable ends, the present invention, in terms of its basic concept, comprehends a blending method and technique adapted to effect its most advantageous accomplishment in which a plurality of two or more viscous liquids that are to be interblended are initially interdistributed with one another in the form of alternate, flatly and continuously adjacent relatively thin ribbon-like layers or sheet-like streams that are subsequently attenuated while remaining in contiguously adjacent contacting disposition with one another until they attain, as a practical matter, a state of infinite and indistinguishable thinness in which they are uniformly interfused and interdispersed one with another, whereupon they assume the integrated characteristics of and may be handled and employed as a homogeneously and thoroughly interblended liquid mass having uniform viscosity and distribution characteristics. Advantageously, the layers are interdispersed for their interfusing attenuation in a regular sequential order of adjacency in such a manner as to extend flatly between two surfaces that are movable or in motion with respect to one another and which are adapted to engage the thin edges of the adjacent plurality of layers to effect their elongation in the desired interblending manner.

It is not a necessity that the liquids to be blended be naturally miscible with one another although, as is apparent, it may unavoidably be easier and simpler under some circumstances to accomplish a desired thorough mixing when miscible liquids are involved.

The invention is more fully delineated and its many features, advantages and benefits are more apparent in the following description and specification, taken in conjunction with the several views of the accompanying drawing, some of which are illustrative of preferred (but not limiting) embodiments of the invention, wherein;

FIGURES 1 and 2, in fragmentary, broken-out portrayals, illustrate in simplified fashion the manner in which blending is achieved with apparatus means according to the present invention;

FIGURE 3 also depicts and demonstrates in an elementary way how blending is accomplished in practice of the invention;

FIGURE 4, an elevation in section, shows one preferred form of embodiment of the apparatus of the invention adapted to operate on the principles that are set forth herein;

Figure 8:
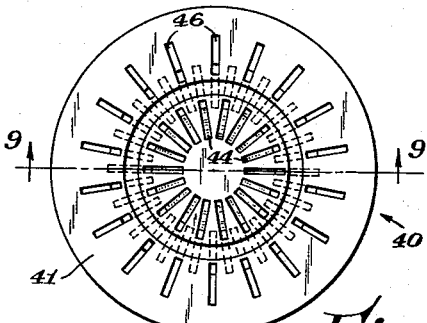
FIGURES 8 and 9 are a plan view and a cross-sectional view taken along the line 9—9 in FIGURE 8, respectively, of the liquid interdistributing element in the assembly shown in FIGURE 5.
Figure 10:
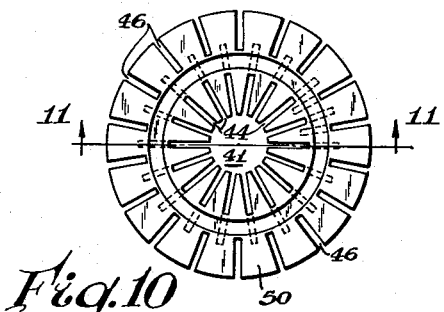
Figure 9:
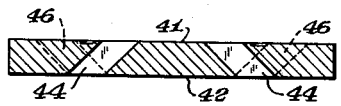
Figure 11:
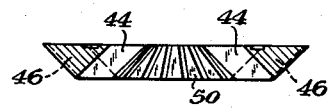
Figure 12:
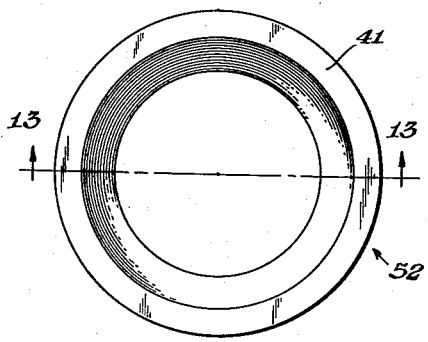
Figure 13:
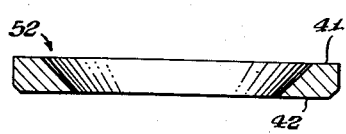
Figure 14:
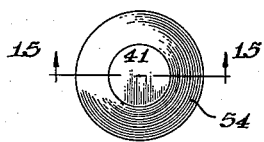
Figure 16:
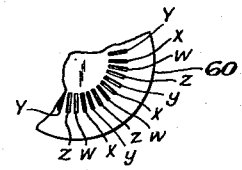
Figure 15:
Figure 17:
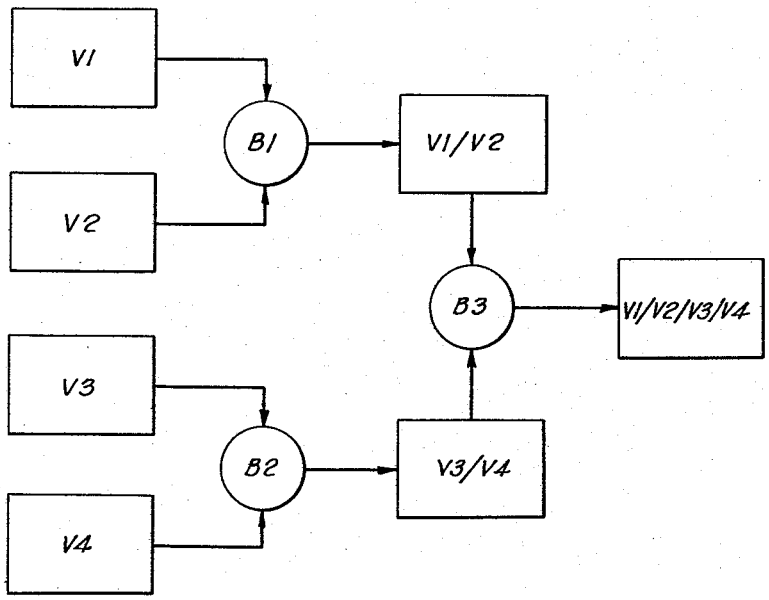

FIGURES 10, 12 and 14 are plan views and FIGURES 11, 13 and 15 are cross-sectional views taken along the lines 11—11, 13—13 and 15—15 in FIGURES 10, 12 and 14, respectively of the component parts of the interdistributing element that is shown in integral relationship in FIGURES 8 and 9;

FIGURE 16 schematically illustrates a modified form of distributor element for complex blending operations; and FIGURE 17 schematically represents another way to achieve complex blending by practice with apparatus according to the invention.

Figure 1:
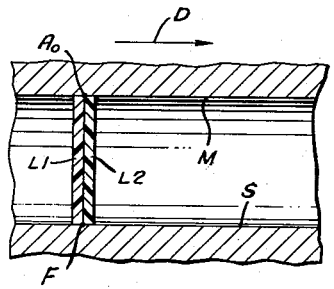
Figure 2:
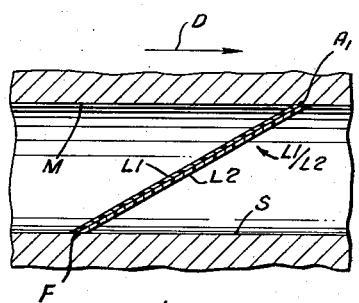

The operation and the function of apparatus means in accordance with the invention is basically depicted in the first three figures of the drawing. With initial reference to FIGURES 1 and 2, there are shown two layers of diverse, miscible viscous liquids L1 and L2 that are desired to be interblended. The liquids may differ merely in their viscosities or they may be completely diverse compositions, such as different polymer solutions that are desired to be mixed or similar compositions that have different ingredients incorporated therein, as, for example, if one of the liquids were to have a pigment uniformly distributed therethrough. And, as has been indicated, even immiscible liquids may be interblended and mixed together, if desired. For the purpose of being interblended in accordance with the invention, the viscous liquids have been formed into the relatively thin layers that are shown in flatly and contiguously adjacent relationship extending between the surfaces (or planes) S and M and engaged therewith at their thin ends at the points F and A, respectively. The surface or plane M is adapted to be moved or is moving in the direction of the arrow D relative to the stationary surface or plane S. During such movement it is assumed that there is no flow or detachment of the viscous material next to or from either of the surfaces S and M. Thus, as is shown in FIGURE 1, the layers L1, L2 initially extend between the fixed point F on stationary surface S and the movable, or moving, point $A_0$ on the movable or moving surface M. The edges of the layers L1, L2 follow the moving surface or plane M by remaining attached at point A during its movement. This causes the flatly contiguous layers to elongate and become attenuated until at some point $A_1$, as shown in FIGURE 2, they have become vanishingly or infinitesimally thin (or practically so) and literally pulled and merged one into the other so as to be indistinguishable. In such condition they assume the homogeneous and thoroughly interblended characteristics of a uniformly mixed liquid product L1/L2.

Figure 3:
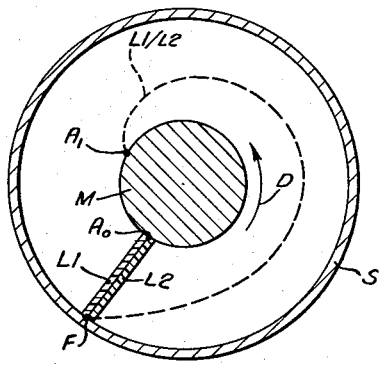

While the relatively movable planes or surfaces for attenuating the interdistributed thin liquid layers may be disposed in spaced, parallel planes, it is generally more expedient, convenient, and effective for them to be spaced concentric and coaxial, circular or cylindrical surfaces, one or both of which is or are adapted to rotate relative to or past the other with the layers that are to be blended being initially interdistributed in a radially extending manner between the surfaces. This is illustrated in FIGURE 3 in which the inner cylindrical surface M is rotatably movable relative to the encircling stationary surface S. The layers L1, L2, in a manner analogous to that shown in FIGURES 1 and 2, are initially disposed radially between the points F and $A_0$ in the annular space or chamber between the surfaces S and M. Upon rotation of the inner cylindrical surface M, they are attenuated until elongated to such an extent and condition, as illustrated by the broken line extending spirally between the points F and $A_1$, that the integrated blended product mixture is provided from the liquid components L1 and L2. As is apparent, a sequential plurality of layers L1, L2, L1, L2, L1, L2 etc. are actually initially radially interdistributed in side by side relationship in the preferred manner of blending. Or, if more than two liquids are involved, an analogous orderly plural sequence of alternate layers is provided for the interblending operation. It is in general accordance with such a technique that the preferred apparatus of the present invention is embodied to facilitate and provide such manner of practice.

In its most desirable form, therefore, the present practice for blending a plurality of diverse, miscible, viscous liquids comprises concentrically interdistributing each of said liquids wth one another in thin, radially extending, sequentially alternate, flatly and contiguous adjacent layers into one end of an annular chamber that is formed between substantially cylindrical, concentric surfaces which are rotatably movable or moving with respect to one another, said alternate layers extending radially in an end-to-end (or edge-to-edge) manner between and in contacting engagement with the defining surfaces of said chamber; spirally attenuating and elongating said alternate layers between said relatively moving surfaces while said layers are passing or being passed longitudinally through said chamber until they are uniformly and homogeneously merged and interblended; and finally withdrawing the blended and thoroughly interdispersed viscous liquid product from the other end of said chamber. Advantageously the inner, cylindrical surface defining said annular chamber is rotatably movable with respect to the outer stationary surface thereof. In addition the inner surface may also, though not necessarily, be adapted to impel or force the blending liquid through the annular mixing chamber so that in the practice of the method the merging liquids are positively forced through the chamber. Preferably, as is apparent, the alternate layers extend in cylindrical configuration about a center and are spirally alternated within such configuration.

Figure 4:
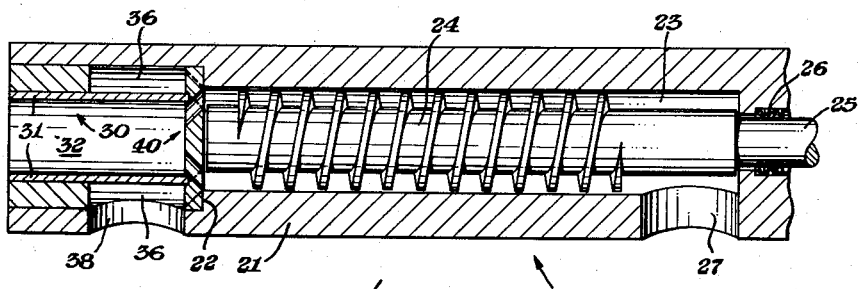

The apparatus illustrated in assembly in FIGURE 4 or embodiments analogous and equivalent thereto are particularly adapted for utilization when performing the described technique. The apparatus, indicated generally by the reference numeral 20, is comprised of a generally cylindrical housing 21 centrally divided by an internal circumferential seat or shoulder 22 that effectively necks or steps down the longitudinal opening through the housing. At one end or in one portion of the housing 21, from the shoulder 22 to the end through the larger internal diameter, is the liquid interdistributing means or unit, indicated generally by the reference numeral 30 and shown more particularly in FIGURES 5, 6, and 7. At the opposite end or portion of the housing 21, from the shoulder 22 to the end through the smaller internal diameter, is the annular blending or mixing chamber 23 wherein the diverse liquids are thoroughly merged. The annular mixing chamber 23 is formed between the inner, smaller diameter surface of the cylindrical housing 21 and a concentric, generally cylindrical rotor 24 which extends longitudinally through the chamber to the interdistributing unit 30. The inner cylindrical rotor 24 is rotatably mounted within the stationary housing 21 on a drive shaft 25, journaled in the housing, connected to suitable drive means (not shown). Gasket or the like packing means 26 may be provided between the shaft 25 and the housing 21 to form a seal against leakage. A lateral outlet 27 is provided in the end of the housing to permit withdrawal of the blended viscous liquid product after its mixing in the annular chamber 23. As shown, the rotor 24 is a screw-type liquid forwarding element for positively forcing the materials being blended through the mixing chamber 23. However, as has been indicated, such liquid impelling means are not essential. A smooth cylindrical rotor (or, if desired, one having a roughened surface) may be utilized to form the inner movable surface in the annular chamber with excellent mixing results provided sufficient pressure is employed at the inlet to force the viscous liquids through the chamber.

Figure 6:
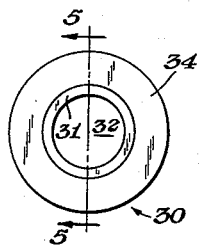
FIGURES 6 and 7 are views of the inlet and outlet ends, respectively, of the assembly of FIGURE 5.
Figure 5:
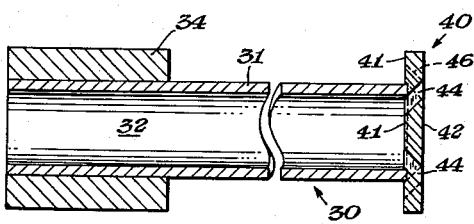
FIGURE 5 is a view in cross-section of the liquid interdistributing unit or assembly of the blender apparatus shown in FIGURE 4.
Figure 7:
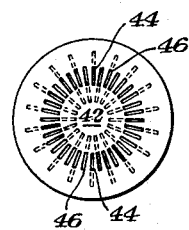

The interdistributing unit 30, as is shown in greater detail in FIGURES 5, 6, and 7, is comprised of a central cylindrical tube at the inner end of which is positioned the interdistributing element, indicated generally by the reference numeral 40, which is particularly illustrated in FIGURES 8 through 15, inclusive. The outer end of the tube 31 is exteriorly provided with a tightly fitted (or integrally formed) protuberant sleeve or boss collar 34 which fits closely within the housing 21 to help position and align the interdistributing unit 30 therein. The inner passageway 32 within the tube 31 provides a feed inlet for one of the viscous liquids to be blended to lead it from the end of the assembly to the interdistributing element 40. The annular passageway 36 between the tube 31 and the housing 21 provides another feed inlet for a second viscous liquid that is to be interblended with the liquid fed through passageway 32. The annular feed passageway 36 is supplied through a lateral opening 38 in the housing 21 and also leads to the interdistributing element 40. It is closed toward the end of the housing 21 by the boss collar 34 about the tube 31 which fits closely within the housing.

The interdistributing element 40, shown in separate assembly in FIGURES 8 and 9, is the heart and essential feature of the entire blender 20. The element 40 is adapted to interdistribute the diverse viscous liquids that are fed separately thereto into the annular mixing chamber 23 in the necessary form of the thin, radially extending, sequentially alternate flatly and contiguously adjacent plurality of layers that are alternated, elongated and ultimately efficiently merged and intermixed in the chamber between and through the action of the stationary inner surface of the cylindrical housing 21 and the central moving rotor surface 24, with each of which the sequentially alternate viscous layers are initially forced in edge-to-edge contact. To accomplish this, the interdistributing element is provided with a plurality of canted slits or orifices leading in alternately skewed paths from the inner feed receiving face 41 to the outer interdistributing face 42 of the element 40. One series of the alternate canted slits 44 is adapted to communicate between the central liquid inlet passageway 32 and the annular chamber 23. The other series of alternate canted slits 46 is adapted to communicate between the annular inlet passageway 36 and the annular chamber 23. All of the slits 44, 46 are preferably uniformly spaced and of about equal size (although, in some instances, a series of slits intended for interdistribution of a particular, say more viscous, liquid may have a larger cross-sectional area for passage of fluid therethrough). All of the alternate slits 44, 46 (which, in an interdigitating sort of pattern lead from different feed inlets for the diverse fluids to be blended) emerge through the outer face 42 of the interdistributing element 40 to extend radially, as substantially rectangular openings, within a concentric, ring-like band which, preferably is coterminous with the annular cross-sectional space of the mixing chamber 23. It is an advantage to provide as many of the interdistributing slits as possible in a given interdistributing element and for each of the slits to be adapted to extrude a relatively thin and flat, ribbon-like stream of liquid to be blended.

For this purpose, if it is possible and convenient to do so, it may be preferable for the maximum spacing between slits on the outer face 42 of the element 40 to be narrower, at the minimum point of said spacing nearest to the center, than the average width of the slits 44, 46 and for the radially-extending length of each slit at the outlet to as nearly as possible approximate the width of the annulus. The width of the annulus itself is preferably limited so that there is a relatively insignificant difference in circumference between the rotor and the enclosing shell of the chamber. This tends to avoid triangular or pie-shaped cross-sections in the ribbon-like layers. In actual practice the number of slits that are employed are generally more or less fixed by principles of good engineering design applied to the properties of the materials being blended and the particular rate of blending that may be desired.

As has been indicated and as is apparent, it is desirable for the ribbon-like layers to be as thin as possible at the time of their initial interdistribution into the mixing chamber. In this way, the amount of attenuation required for thorough blending may be minimized and, as a consequence, less in the way of apparatus requirements involved. The actual width of each slit in particular instances and the resulting thickness of the ribbon-like stream of liquid that is extruded therethrough is determined by the viscosity of the material being handled and its rate of extrusion through the slit. If greater force or power is expended during the extrusion, a greater extrusion rate and consequently thinner streams will generally result. In addition to this, the precise number of slits to be utilized in a particular apparatus depends to some extent upon the quantity of liquid being handled. Generally the amount of power that is required for attenuation of the layers during their interblending is lessened as with a greater number of layers of given thickness. Thus it is desirable to employ as many slits as possible in each blending unit and to position them at the closest possible spacing from one to the other, taking into account the limits imposed by the strength of the material of construction with which the distributor element is fabricated.

From the foregoing, it can be appreciated that in each specific case involving particular materials to be blended, the number of slits and their dimensions and locations are fixed by and differ with the particular materials that are involved, the relative quantities of such liquids that are being mixed and other of the above-indicated considerations. The precise design of apparatus that may be most suitable under given circumstances are largely matters of geometry and power consumption which do not necessarily have pertinent bearing upon the operability of the device with the exception that at least two slits must be employed when two liquids are being blended and the total number of interdistributed slits that are used must be a multiple of the total number of materials being blended.

The interdistributing element 40 can be provided with the alternate series of slits 44, 46 in any desired manner. For example, the canted slits can be cut directly through a disc like member. A convenient and facile way to provide the element 40, however, is to assemble it from three separate concentric members, joined together by any suitable means, the central member of the trio being a frusto-conical plug-like body having an oppositely funneled frusto-conical central opening, into which the alternately canted series of slits may be easily cut by means operating laterally from within and without the assembly. The elements for such a three-piece construction are shown in FIGURES 10 through 15, inclusive. The central, laterally slotted, plug-like body 50 is shown in FIGURES 10 and 11. The slit-providing body 50 is adapted to fit within an outer-confining, internally-tapered rim member 52 which encircles the frusto-conical body 50 and completes the definition of the outwardly extending slits 46 cut therein. An inner frusto-conical part 54, fits within the central body 50 to perfect the element 40 by providing the completing definition for the inwardly extending slits 44 that are cut therein. The assembly of the integral element 40 from the matching cooperating parts 50, 52, and 54 will be easily grasped by those skilled in the art.

In operation, as is apparent from the foregoing, one of the viscous liquids to be blended is fed through the central passageway 31 from the end of the blender 20 and the other liquid is admitted through inlet opening 38 to the annular passageway 36. It is advantageous, incidentally, for the viscosity differential of the liquids that are to be blended to not exceed a factor or ratio of about 100 and preferable, in this connection, for the viscosity of the thicker liquid to be not greater than about 30 to 50 times that of the thinner viscous liquid being blended. The liquids are advantageously handled under sufficient pressure to easily force them through the blender. Such a procedure, of course, readily dispenses with any need to employ a fluid impelling type of rotor. The liquid in the inner passageway 32 is passed through the centrally diverging series of slots 44 in the interdistributing unit to issue as a plurality of radially extending, ribbon-like streams in the annular mixing chamber 23, between each pair of which is interspersed a similar layer of the fluid passed as the plurality of streams through the outwardly diverging slits 46 from the annular feed passageway 36. In the mixing chamber 23, the alternate ribbons of viscous fluid are attenuated and elongated in the described manner by the action of the rotating rotor 24 until their individual layer characteristics vanish and they are thoroughly interdispersed and uniformly and homogeneously mixed. The blended viscous liquid product is withdrawn from the mixing chamber 23 through the outlet 27 for its intended utilization. Advantageously, the interblending layers are spirally attenuated by at least about 25, and preferably at least about 100, revolutions of the rotor during the residence time in or passage through the mixing chamber of the fluid being blended. This, of course, may vary in particular instances with particular fluids. However, in a given blender, best results are obtained by adjusting the rotational rate of the rotor to the feed rate of the fluids being blended and the capacity of the chamber so that a residence time of at least about 10 seconds is encountered.

It is generally desirable to interblend about equal volumes per unit time of the diverse liquids being blended although it is possible to attain suitable results when the unit volume ratio of the diverse liquids being blended is as large as 100 to 1, particularly when the volume per unit time of the thinner liquid being blended is much less than that of the more viscous material. As might be anticipated, the blending efficiency of apparatus in accordance with the invention is in direct proportional relationship to the throughput or machine efficiency of the apparatus being employed. The number of alternate feed slits that are provided in the interdistributing element have little bearing upon the blending efficiency that may be realized, although, as mentioned, lower power requirements are generally involved as more slits are utilized. As a practical matter, in this connection, it is usually preferred to employ a total of at least about 10 slits in the blender for alternately feeding the streams of viscous liquid from the separate inlet passageways.

The blenders and the blending method of the present invention are readily capable of easily blending highly viscous liquids, say those with an absolute viscosity at room temperature in excess of 5000 centipoises, to uniform, homogeneous mixtures without encountering the usual difficulties that are involved due to the tendency of such materials to flow without turbulent characteristics. In addition to and in combination with the total number of slots that are employed in the interdistributing element in the blender, optimum performance and results may generally be obtained by designing the blender so that it may have a sufficiently large and long mixing chamber to afford adequate residence for thorough blending of the liquids being mixed, taking into account the rate of rotation at which the apparatus is operated and the degree of spiral attenuation that is involved in the blending of the interdistributed layers.

As has been indicated, more than two diverse liquids may be advantageously blended with apparatus and by the means of the invention. This may be accomplished by furnishing an interdistributing element in the blender that is adatped to alternately and in sequential order interdisperse ribbon-like streams of liquid through the slit-like orifices which are serially arranged in the element to communicate with the appropriate number of separate inlet feed passageways for the fluids to be blended. The layer disseminating face of an interdistributing element 60 that is adapted to extrude four separate liquids in sequentially alternate, radially interdisposed ribbon-like streams is schematically illustrated in a fragmentary plan view in FIGURE 16. In the element 60 four series of slits, designated respectively by the letters W, X, Y, and Z are adapted to pass four individual viscous liquids from four separate feed inlets to the same annular mixing chamber wherein they may be interblended, and homogeneously mixed with utmost efficiency and dispatch to a consistent viscous liquid product. Any desired number of liquids can be so handled for blending although, as a practical matter, the apparatus requirements become more complex and involved in proportion to the number of liquids being handled.

Another way to handle a plurality of liquids is schematically represented in the manner of a flow diagram in FIGURE 17. Thus, if it is desired, for example, to blend four separate liquids into a single product, a convergingly parallel processing arrangement may be invoked wherein no more than two separate liquids are ever involved in a single blending step. As shown, the liquids V1 and V2 may be mixed in the blender B1 to the homogeneous product V1/V2. Similarly, liquids V3 and V4 are thoroughly blended by the apparatus B2 to the uniform product V3/V4. The ultimate homogeneous blend V1/V2/V3/V4 of the component liquids V1, V2, V3, V4 that are desired to be intermixed is obtained by passing the intermediate blended materials V1/V2 and V3/V4 through a third blender apparatus B3. Such a procedure may be especially useful when it is desired to interblend a minor proportion of a particular type of viscous liquid, such as a concentrate formulation of a polymeric composition containing pigment or coloring matter dispersed therein, with other similar viscous material to obtain uniform final product.

By way of further illustration, a blender similar to that depicted in FIGURE 4 has been extensively employed to produce a polymer solution of constant 2100 poise viscosity at 35° C. from diverse low and high viscosity supply streams of the same type of polymer solution having individual viscosities of between about 1200 and 2100 poises and 2100 and 3500 poises, respectively. The interdistributing element in the apparatus had a total of 36 slits (18 for each feed stream) each of which had a rectangular outlet dimension of about $3/_{32}$ x $5/_8$ inch equally spaced and radially extending to fit within an annular ring-like band having an inner diameter of about 0.870 inch and being radially coterminous with the annular mixing chamber to which they led. The chamber had a length of about 19 inches and contained a screw flight type of rotor that was operated at about 114 revolutions per minute so as to spirally attenuate the interdispersed ribbon-like layers of the polymer solutions to about 61 revolutions with the blender providing the homogeneously mixed viscous liquid product at a uniform rate of about 23 gallons per hour. The residence time of the materials in the chamber was about 0.535 minute, on an average basis.

Individuals gifted with the skill of their calling will immediately appreciate that many variations and alterations from the foregoing demonstrative embodiments can be entered into in the practice of the present invention without substantially departing from the spirit and scope of the contribution to the art that it contemplates and without essentially deviating or distinguishing from the manner in which it is set forth and defined in the hereto appended claims.

What is claimed is:

1. In combination in a blender for diverse viscous liquids; a pair of substantially uniformly spaced surfaces disposed and adapted so as to be moveable relative to one another; means for interdistributing each of said liquids in a plurality of sequentially alternate, flatly and contiguously adjacent, ribbon-like layers so that the edges of said layers are in respective contact with and between said surfaces; and means for moving at least one of said surfaces relative to the other in a direction across the flat thickness of said layers so as to attenuate and elongate said plurality of adjacent layers until they have become vanishingly thin and thoroughly interdispersed with one another.

2. The combination of claim 1, wherein said liquid interdistributing means are adapted to continuously interdistribute said liquid layers and said surface moving means are adapted to continuously move one of said surfaces relative to the other so as to continuously attenuate and elongate said interdistributed adjacent layers.

3. In combination in a blender for diverse, viscous liquids, means for concentrically interdistributing in cylindrically assembled configuration each of said liquids with one another in thin, radially extending, sequentially alternate, flatly and contiguously adjacent, ribbon-like layers; and means in contact with the longitudinal edges of said layers for spirally attenuating and elongating said alternate layers across their edge-to-edge width within said cylindrical configuration until they have become vanishingly thin and thoroughly interdispersed with one another.

4. Apparatus for blending diverse, viscous liquids comprising means for defining an annular mixing chamber, said means including a central, concentric, generally cylindrical rotor that is rotatable about its longitudinal axis; an interdistributing element at one end of said chamber, said element consisting of a disc-like member having a plurality of circularly disposed, radially extending slits passing therethrough; separate liquid feed passageways for each liquid to be blended leading to said interdistributing element, each of said passageways being in communication with a portion of said slits in sequentially alternate communicating sequence; means for rotating said rotor in said chamber; and outlet means for withdrawing blended liquid product from said chamber.

5. Apparatus for blending diverse, viscous liquids comprising means for defining an annular mixing chamber, said means including a central, concentric, generally cylindrical rotor that is rotatable about its longitudinal axis;

an interdistributing element at one end of said chamber, said element consisting of a disc-like member having a plurality of evenly spaced uniformly proportioned, circularly disposed, radially extending slits passing therethrough, said slits being radially coterminous with the annular cross-section of said chamber; separate liquid feed passageways for each liquid to be blended leading to said interdistributing element, each of said passageways being in communication with a like portion of said slits in sequentially alternate communicating sequence; means for rotating said rotor in said chamber; and outlet means for withdrawing blended liquid product from said chamber.

6. Apparatus for blending a pair of viscous liquids comprising means for defining an annular mixing chamber, said means including a central, concentric, generally cylindrical rotor that is rotatable about its longitudinal axis; an interdistributing element at one end of said chamber, said element consisting of a plurality of evenly spaced, uniformly rectangular, circularly disposed, radially-extending, canted slits passing therethrough, said slits emerging from said element so as to be radially coterminous with the annular cross-section of said chamber, alternate slits being canted to incline in opposite directions from the center of said chamber, every other slit being outwardly divergent with the remainder being inwardly convergent; a central feed passageway for one of said liquids leading to said interdistributing element and being in communication with said inwardly convergent alternate slits; an annular feed passageway about said central feed passageway leading to said interdistributing element and being in communication with said outwardly divergent slits; means for rotating said rotor in said chamber; and outlet means for withdrawing blended liquid product from said chamber.

7. The apparatus of claim 6, wherein said rotor is a smooth cylinder.

8. The apparatus of claim 6, wherein said rotor is a screw-type fluid impelling element.

9. The apparatus of claim 6, wherein the space on said interdistributor element between said slits emerging therethrough at the minimum radially innermost point of said space is less than the average width of said slits.

10. The apparatus of claim 6, wherein said interdistributor element contains a total of at least about 10 oppositely canted slits.

11. The apparatus of claim 6 in combination with means for supplying diverse polymeric compositions thereto, each having a minimum viscosity of at least about 50 poise.

12. The apparatus of claim 6 in combination with means for supplying diverse liquids thereto.

13. The apparatus of claim 6 in combination with means for supplying miscible liquids thereto.

14. The apparatus of claim 6 in combination with means for supplying polymeric compositions thereto.

15. The apparatus of claim 6, wherein said chamber is large enough to provide a residence time of at least about 10 seconds for liquids being blended therein.

16. The apparatus of claim 6, wherein said chamber is large enough to provide a residence time of at least about 10 seconds for liquids being blended therein and said means for rotating said rotor in said chamber is adequate to cause at least about 25 spirally attenuated revolutions of said liquid being blended in said chamber while passing therethrough.

References Cited in the file of this patent

UNITED STATES PATENTS

| | | |
|---|---|---|
| 1,935,884 | Loomis et al. | Nov. 21, 1933 |
| 2,178,955 | Draemann | Nov. 7, 1939 |
| 2,266,652 | McLean | Dec. 16, 1941 |
| 2,336,159 | Bent | Dec. 7, 1943 |
| 2,345,086 | Becker et al. | Mar. 28, 1944 |
| 2,409,339 | Ballard | Oct. 15, 1946 |
| 2,597,422 | Wood | May 20, 1952 |
| 2,623,786 | Willie | Dec. 30, 1952 |
| 2,730,433 | Cartledge | Jan. 10, 1956 |
| 2,815,532 | Braunlich | Dec. 10, 1957 |